(12) United States Patent
Park

(10) Patent No.: US 8,706,295 B2
(45) Date of Patent: Apr. 22, 2014

(54) APPARATUS AND METHOD FOR SYNCHRONIZING ROBOTS

(75) Inventor: Chang Hyun Park, Seoul (KR)

(73) Assignee: IR Robot Co., Ltd., Bucheon-si, Gyeonggi-do (KR)

( * ) Notice: Subject to any disclaimer, the term of this patent is extended or adjusted under 35 U.S.C. 154(b) by 417 days.

(21) Appl. No.: 12/967,279

(22) Filed: Dec. 14, 2010

(65) Prior Publication Data

US 2012/0150352 A1   Jun. 14, 2012

(51) Int. Cl.
*G06F 19/00* (2011.01)

(52) U.S. Cl.
USPC ............ 700/245; 700/246; 700/250; 700/253

(58) Field of Classification Search
USPC ........... 700/245–264, 1, 3, 17, 29–31, 65, 66, 700/83, 87–88, 180–186
See application file for complete search history.

(56) References Cited

U.S. PATENT DOCUMENTS

| | | | | |
|---|---|---|---|---|
| 6,438,457 B1 * | 8/2002 | Yokoo et al. | | 700/245 |
| 6,442,450 B1 * | 8/2002 | Inoue et al. | | 700/245 |
| 6,697,708 B2 * | 2/2004 | Takagi et al. | | 700/245 |
| 6,845,297 B2 * | 1/2005 | Allard | | 700/259 |
| 6,862,497 B2 * | 3/2005 | Kemp et al. | | 700/264 |
| 7,027,963 B2 * | 4/2006 | Watanabe et al. | | 703/1 |
| 7,027,965 B2 * | 4/2006 | Hannaford et al. | | 703/2 |
| 7,089,083 B2 * | 8/2006 | Yokoo et al. | | 700/245 |
| 7,298,385 B2 * | 11/2007 | Kazi et al. | | 345/633 |
| 7,353,081 B2 * | 4/2008 | Skourup et al. | | 700/245 |
| 7,353,082 B2 * | 4/2008 | Pretlove et al. | | 700/264 |
| 2002/0062176 A1 * | 5/2002 | Fujita | | 700/245 |
| 2002/0183895 A1 * | 12/2002 | Kaplan et al. | | 700/245 |
| 2003/0045203 A1 * | 3/2003 | Sabe et al. | | 446/356 |
| 2005/0197739 A1 * | 9/2005 | Noda et al. | | 700/245 |
| 2006/0161300 A1 * | 7/2006 | Gonzalez-Banos et al. | .. | 700/245 |
| 2006/0287772 A1 * | 12/2006 | Sandner et al. | | 700/253 |
| 2007/0073442 A1 * | 3/2007 | Aghili | | 700/245 |
| 2007/0213874 A1 * | 9/2007 | Oumi et al. | | 700/245 |
| 2007/0282485 A1 * | 12/2007 | Nagatsuka et al. | | 700/245 |
| 2008/0161677 A1 * | 7/2008 | Sutherland et al. | | 600/417 |
| 2009/0082879 A1 * | 3/2009 | Dooley et al. | | 700/3 |
| 2009/0234788 A1 * | 9/2009 | Kwok | | 706/46 |
| 2010/0145514 A1 * | 6/2010 | Kim et al. | | 700/248 |
| 2012/0150352 A1 * | 6/2012 | Park | | 700/264 |

* cited by examiner

*Primary Examiner* — Bhavesh V Amin
(74) *Attorney, Agent, or Firm* — Lucas & Mercanti, LLP

(57) ABSTRACT

Disclosed herein are an apparatus and method for synchronization robots. According to an aspect of the present invention, a portable robot synchronization apparatus includes a storage unit configured to store data defining physical models and behaviors of a real robot, a manipulation unit, an output unit, a communication unit configured to perform wired and wireless communication with the real robot or a server, and a control unit configured to model a size and behavior of a virtual robot, having a shape and behavior of the real robot, in response to a manipulation command received through the manipulation unit, on the basis of the data stored in the storage unit, output the modeled virtual robot through the output unit, and control the behavior of the virtual robot in response to the behavior of the real robot when communicating with the real robot through the communication unit.

10 Claims, 4 Drawing Sheets

APPARATUS AND METHOD FOR SYNCHRONIZING ROBOTS

CROSS REFERENCE

This application claims foreign priority under Paris Convention and 35 U.S.C. §119 to Korean Patent Application No. 10-2009-0123954 filed on Dec. 14, 2009 with the Korean Intellectual Property Office.

BACKGROUND OF THE INVENTION

1. Field of the Invention

An aspect of the present invention relates to a robot and, more particularly, to a robot synchronization technique.

2. Background of the Related Art

The robot industry is developed daily, and it is expected that the robot industry will become one of the important industries which determine national competitiveness in the near future. Accordingly, there is an increasing interest in household robots for the popularization of the robot industry and robot technology and robots for education and toys. A number of robot companies are greatly contributing to robot industrialization on the basis of not only robots for industry, but also robots for homes, education, and toys. It is expected that investment and technology development for intelligent robots will be accelerated in the future.

Meanwhile, there are suggested techniques for simulating robots. For example, there are disclosed tools for fabricating a virtual robot in software and comparing a behavior of the virtual robot and a behavior of a real robot through simulation.

Meanwhile, the general public becomes accustomed to playing game through an images displayed on various display devices. This makes it difficult for the general public to wirelessly control a number of robots using an additional complicated controller. Accordingly, there is a need for the development of technology for controlling a robot while seeing an image displaying the behavior of the robot in conjunction with the behavior of the robot.

SUMMARY OF THE INVENTION

Accordingly, the present invention has been made in view of the above problems occurring in the prior art, and an aspect of the present invention suggests an apparatus and method for synchronizing robots, which are capable of providing the behavior of a virtual robot through an image in conjunction with the behavior of a real robot. Another aspect of the present invention suggests an apparatus and method for synchronizing robots, which are capable of synchronizing a virtual robot and a real robot.

A robot synchronization apparatus according to an aspect of the present invention includes a storage unit configured to store data defining the physical model and behaviors of a real robot, a manipulation unit, an output unit, and a control unit configured to model the behavior of a virtual robot in response to a manipulation command, received through the manipulation unit, on the basis of the data stored in the storage unit and to output the modeled virtual robot through the output unit.

According to another aspect of the present invention, the robot synchronization apparatus further includes a communication unit configured to perform wired and wireless communication with the real robot or a server. The control unit converts a robot manipulation command protocol capable of manipulating the real robot in response to the manipulation command of the manipulation unit and sends the models and behavior data of the modeled virtual robot to the real robot through the communication unit using the converted robot manipulation command protocol.

According to yet another aspect of the present invention, the control unit receives behavior data according to a result of the behavior of the real robot from the real robot through the communication unit, stores the received behavior data in the storage unit, and controls the behavior of the virtual robot on the basis of the stored behavior data of the real robot.

According to further yet an aspect of the present invention, the control unit integrates a plurality of the manipulation commands received through the manipulation unit, stores the plurality of manipulation commands in the storage unit in the form of one consecutive manipulation command, and controls the behavior of the real robot by sending the one consecutive manipulation command of the storage unit to the real robot through the communication unit.

Meanwhile, a robot synchronization method according to an aspect of the present invention includes the steps of storing data defining the physical models and behaviors of a real robot, receiving a manipulation command to control a virtual robot, modeling a behavior of the virtual robot on the basis of the stored data in response to the received manipulation command, and outputting the modeled virtual robot.

BRIEF DESCRIPTION OF THE DRAWINGS

Further objects and advantages of the invention can be more fully understood from the following detailed description taken in conjunction with the accompanying drawings in which.

DESCRIPTION OF REFERENCE NUMERALS OF PRINCIPAL ELEMENTS IN THE DRAWINGS

| | |
|---|---|
| 1: real robot | 2: robot synchronization apparatus |
| 20: virtual robot | 200: storage unit |
| 220: manipulation unit | 240: output unit |
| 260: control unit | 280: communication unit |

DETAILED DESCRIPTION OF EMBODIMENTS

Hereinafter, some embodiments of the present invention are described in detail with reference to the accompanying drawings. In describing the present invention, when a detailed description of pertinent known functions or structures is determined to obscure the subject matter of the present invention, the detailed description will be omitted. Terms described herein are defined with consideration taken of the functions in the present invention, and they may vary according to an intention of a user or an operator or to usual practices. Accordingly, the definition should be made on the basis of the contents of the entire specification.

Figure 1:
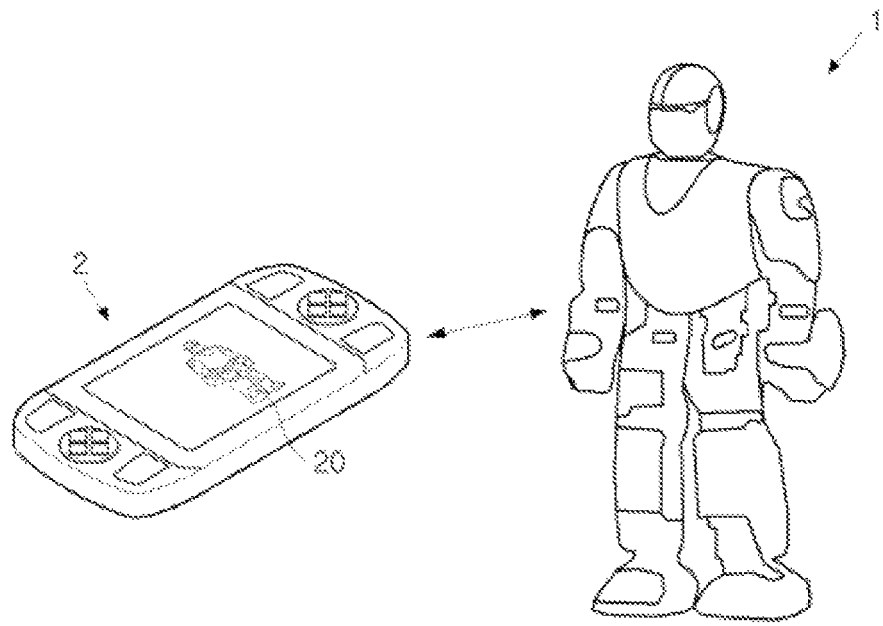
FIG. 1 is a diagram showing a robot synchronization apparatus and a real robot according to an embodiment of the present invention.

FIG. 1 is a diagram showing a robot synchronization apparatus 2 and a real robot 1 according to an embodiment of the present invention.

Referring to FIG. 1, the robot synchronization apparatus 2 may include all kinds of electronic devices which can display a virtual robot in real time in a virtual world. For example, the robot synchronization apparatus 2 may include a computer, a notebook computer, TV, a mobile phone, a Personal Digital Assistant (PDA), and a Portable Multimedia Player (PMP), but not limited thereto.

A virtual robot of the robot synchronization apparatus 2 of the present invention and a real robot in the real world are synchronized in real time through conjunction. That is, a behavior of the virtual robot may be reflected in a behavior of the real robot in real time, or a behavior of the real robot may be reflected in a behavior of the virtual robot in real time. Accordingly, the virtual robot and the real robot may perform the same operation.

The real robot may include all kinds of robots which can be operated in the real world. Here, the robot may be of a type in which a number of actuators are connected and assembled electrically or mechanically. For example the robot may be a modular robot. The modular robot may be humanoid (that is, a human-like robot) or robots for education, toys, homes, game, or industry which are fabricated as a puppy robot or a dinosaur robot.

Figure 2:
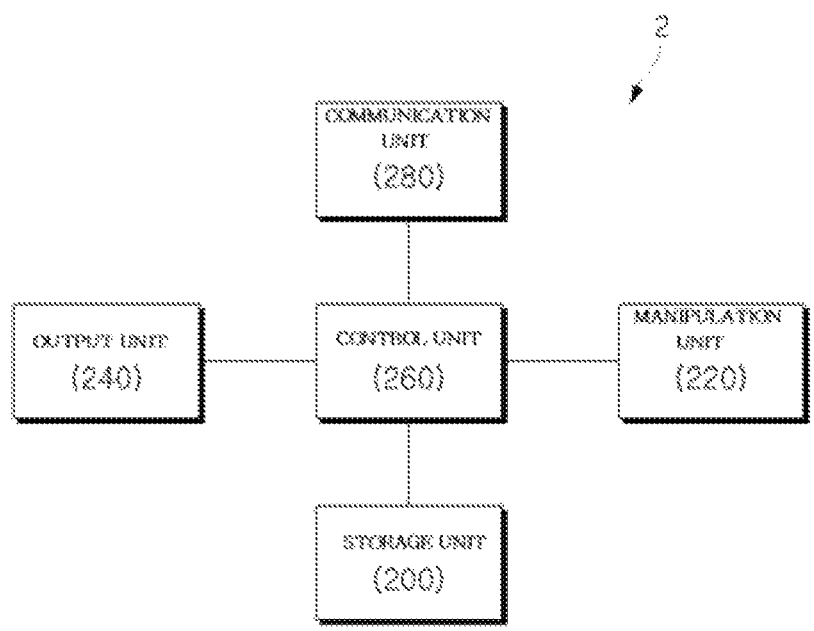
FIG. 2 is a block diagram showing the robot synchronization apparatus according to an embodiment of the present invention.

FIG. 2 is a block diagram showing the robot synchronization apparatus 2 according to an embodiment of the present invention.

Referring to FIG. 2, the robot synchronization apparatus 2 according to the embodiment may include a storage unit 200, a manipulation unit 220, an output unit 240, and a control unit 260. The robot synchronization apparatus 2 may further include a communication unit 280.

The storage unit 200 stores data defining the physical models and behaviors of the real robot 1. The storage unit 200 further stores a program to drive the virtual robot 20 according to a predetermined operation pattern of the robot. The data defining the physical models and behaviors may include data necessary to operate the virtual robot 20, such as constraints including a position value of each of the actuators of the virtual robot 20, a direction of rotation and a speed of revolution of the virtual robot 20, and a limited angle at which the actuator may be moved. The storage unit 200 may be formed of a detachable memory or an external database apparatus.

The storage unit 200 may further store data, defining the physical models and behaviors, in the form of encryption. The manipulation unit 220 may include all kinds of input interfaces which can be manipulated by a user. For example, the manipulation unit 220 may be a key entry form, including direction keys, such as the left, right, top, and bottom, and an OK key. In alternative, the manipulation unit 220 may be a joystick form or a touch pad form capable of detecting a touch signal through a touch sensor. In another alternative, the manipulation unit 220 may be in the form of a mouse, a pointing stick, a shape input panel (that is, tablet), a trackball, a light pen, or a shape processing flat panel (that is, a graphics tablet). Meanwhile, the manipulation unit 220 is of an input device type of a portable electronic device, and it may have the input interfaces embedded therein.

The output unit 240 outputs the virtual robot 20 on a screen in response to a control signal of the control unit 260. Here, the output unit 240 may output the virtual robot 20 in a 3D video. The output unit 240 may also output light, an alarm, etc. externally. To this end, the output unit 240 may include a Light-Emitting Diode (LED), a buzzer, a Liquid Crystal Device (LCD) and the like.

The output unit 240 may be integrally formed with the manipulation unit 220 because it includes the touch sensor. In this case, the output unit 240 provides an interface for controlling display functions in response to the touch signal through the touch sensor. For example, the output unit 240 may be used to perform behaviors of the virtual robot 20 on the screen or to transfer commands associated with the behaviors.

Meanwhile, the communication unit 280 performs wired and wireless communication with the real robot 1 or a server (not shown).

The control unit 260 controls the general operation of the robot synchronization apparatus 2 and controls the storage unit 200, the manipulation unit 220, the output unit 240, and the communication unit 280. Here, the control unit 260 models a behavior of the virtual robot 20 in response to a manipulation command, received through the manipulation unit 220, on the basis of the data stored in the storage unit 200. Next, the control unit 260 outputs the modeled virtual robot 20 through the output unit 240. The manipulation command may include all kinds of commands which can be manipulated by a user through the manipulation unit 220. The manipulation command may be, for example, a walk command, a command other than the walk command, or a joint unit command of the virtual robot 20.

The modeling task of the control unit 26 is a task of shaping the real robot 1 in the form of the virtual robot 20 in a virtual space. For example, the control unit 260 may calculate a direction of rotation and a speed of revolution of the virtual robot 20 with reference to the behavior data of the real robot 1, stored in the storage unit 200, in response to the manipulation command received from the manipulation unit 220. Next, the control unit 260 may calculate a travel angle when the actuators of the virtual robot 20 are driven. Next, the control unit 260 may model the virtual robot 20 on the basis of the calculated results.

Here, the control unit 26 models the virtual robot 20, suitable for the screen, such that the virtual robot 20 may move to a corresponding position on the screen of the output unit 240 or the actuator may be operated. For example, the control unit 26 may calculate the direction of rotation, the speed of revolution, and the travel angle of the virtual robot 20 suitably on the screen. Assuming that the manipulation command received through the manipulation unit 220 is the walk command of the virtual robot 20, the control unit 26 may calculate the direction of rotation, the speed of revolution, and the travel angle which form the height, a pace, an angle, and a speed of a foot of the virtual robot 20 on the screen. Next, the control unit 26 outputs the virtual robot 20 through the output unit 240 on the basis of the calculated results.

According to an embodiment, the control unit 260 may convert a robot manipulation command protocol capable of manipulating the real robot 1, in response to the manipulation command of the manipulation unit 220. Here, the robot manipulation command protocol defines parameters which enable communication between the real robot 1 and the virtual robot 20 of the robot synchronization apparatus 2 or between the virtual robot 20 and the server (not shown). Next, the control unit 260 sends the model and behavior data of the modeled virtual robot 20 to the real robot 1 through the communication unit 280 using the converted robot manipulation command protocol. Here, the real robot 1 may be operated in real time on the basis of the model and behavior data of the virtual robot 20.

Furthermore, the control unit 260 receives data, regarding the behaviors of the real robot 1, from the real robot 1 through the communication unit 280 and stores the received data in the storage unit 200. Next, the control unit 260 controls the behaviors of the virtual robot 20, being outputted through the output unit 240, on the basis of the stored behavior data of the real robot 1. Accordingly, the robot synchronization apparatus 2 may reflect the behavior results of the real robot 1 in the behaviors of the virtual robot 20 outputted through the output unit 240.

For example, according to an embodiment of the robot synchronization apparatus 2 reflecting the behavior results of the real robot 1, when the robot synchronization apparatus 2 receives data regarding a physical posture (for example, standing or sit) of the real robot 1 through the communication unit 280, the robot synchronization apparatus 2 may recognize the physical posture of the real robot 1 through the control unit 260 and modify the virtual robot 20, being outputted through the output unit 240, in the same manner as the physical posture of the real robot 1. The modification task may be implemented in such a manner that the virtual robot 20 is automatically returned.

Meanwhile, the control unit 260 according to an embodiment may integrate the plurality of manipulation commands received through the manipulation unit 220 and store the integrated manipulation commands in the storage unit 200 in the form of one consecutive manipulation command. The one consecutive manipulation command is defined as a macro which processes, as one consecutive behavior, several unit behaviors possible in the real robot 1. For example, in order to implement a greeting behavior of the real robot 1, the control unit 260 may integrate a posture to lower the head, a posture to raise the head, and a posture to shake the hands in a basic standing behavior of the real robot 1 as a series of consecutive behaviors and store the series of consecutive behaviors in the storage unit 200.

In this case, the control unit 260 may control the behavior of the real robot 1 by sending the one consecutive manipulation command, stored in the storage unit 200, to the real robot 1 through the communication unit 280. For example, when the control unit 260 sends one consecutive greeting behavior command of the real robot 1 to the real robot 1 through the communication unit 280, the real robot 1 may perform a series of greeting behaviors.

Meanwhile, according to an embodiment of the present invention, the control unit 260 may recognize a real robot to be communicated therewith on the basis of a unique ID or an automatic robot recognition code which is distinguished from that of the real robot and communicate with the recognized real robot through the communication unit 280. This is for the purpose of preventing the real robot to be communicated from being confused with real robots other than the real robot to be communicated.

The control unit 260 according to an embodiment may group a plurality of real robots. Furthermore, the control unit 260 may send the models and behavior data of a modeled virtual robot to the plurality of real robots through the communication unit 280 by using the converted robot manipulation command protocol. Here, the plurality of grouped real robots is controlled in conjunction with the models and behavior data of the above-described virtual robot.

Meanwhile, the output unit 240 according to an embodiment of the present invention may output information about the actuators and sensor of the real robot 1, received from the real robot 1, and the storage unit 200 may store the information. Furthermore, the manipulation unit 220 may receive a command to manipulate the virtual robot 20 from a user on the basis of information about a joint actuator and a sensor outputted through the output unit 240.

The actuator information may be information about a robot joint which is a basic unit constituting the robot. The sensor information may include pieces of information detected by various sensors configured to detect specific surrounding conditions and to output values thereof, such as a position sensor for detecting a position of the robot, an optical sensor, a gas sensor for detecting surrounding gas, a temperature sensor for detecting temperature, a vibration sensor for detecting vibration, and a pressure sensor for detecting pressure.

Furthermore, the output unit 240 may output error information. The error information may include errors occurring upon communication through the communication unit 280, recognition error of a manipulation command received through the manipulation unit 220 and the like.

Figure 3:
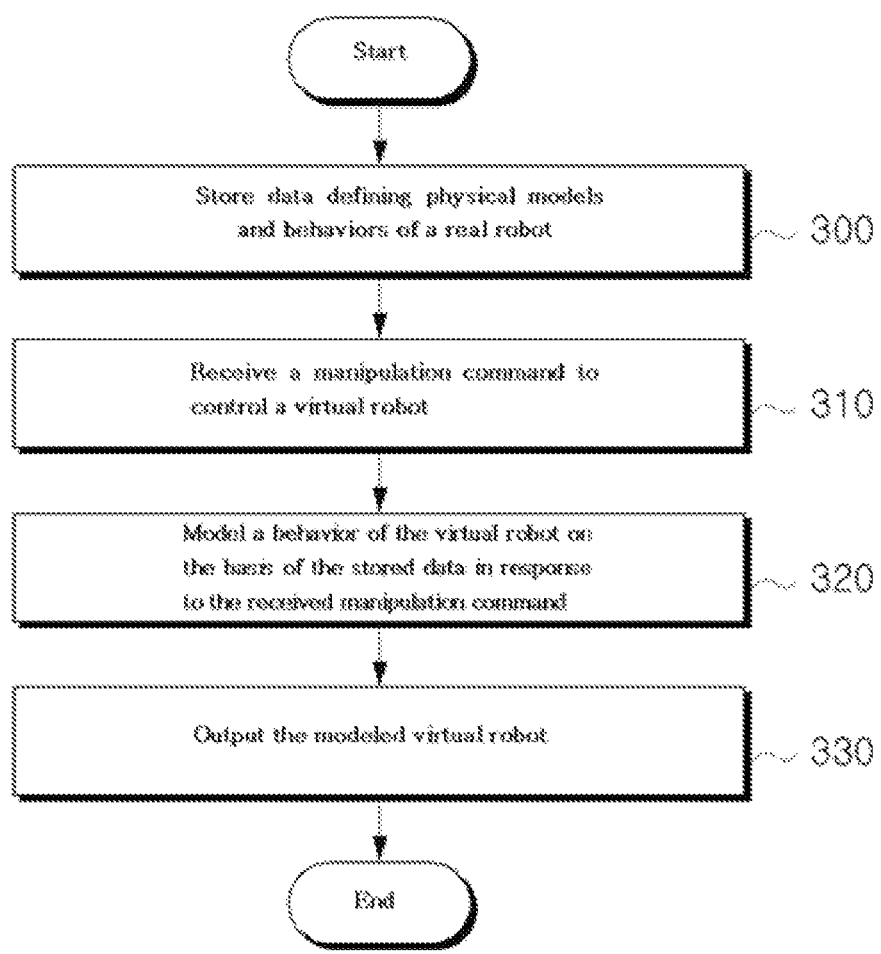
FIG. 3 is a flowchart illustrating a robot synchronization method according to an embodiment of the present invention.

FIG. 3 is a flowchart illustrating a robot synchronization method according to an embodiment of the present invention.

Referring to FIG. 3, the robot synchronization apparatus 2 stores data defining the physical models and behaviors of the real robot 1 at step 300. Next, the robot synchronization apparatus 2 receives a manipulation command to control the virtual robot 20 at step 310. Next, the robot synchronization apparatus 2 models a behavior of the virtual robot 20 on the basis of the stored data in response to the received manipulation command at step 320. Next, the robot synchronization apparatus 2 outputs the modeled virtual robot 20 at step 330.

In accordance with the robot synchronization method, a user may be provided with the feeling of movement as if he operates a real robot through the virtual robot. Accordingly, a user's interesting and fun can be increased. Furthermore, the general public can easily control a robot through manipulation using the virtual robot even without a complicated controller.

Figure 4:
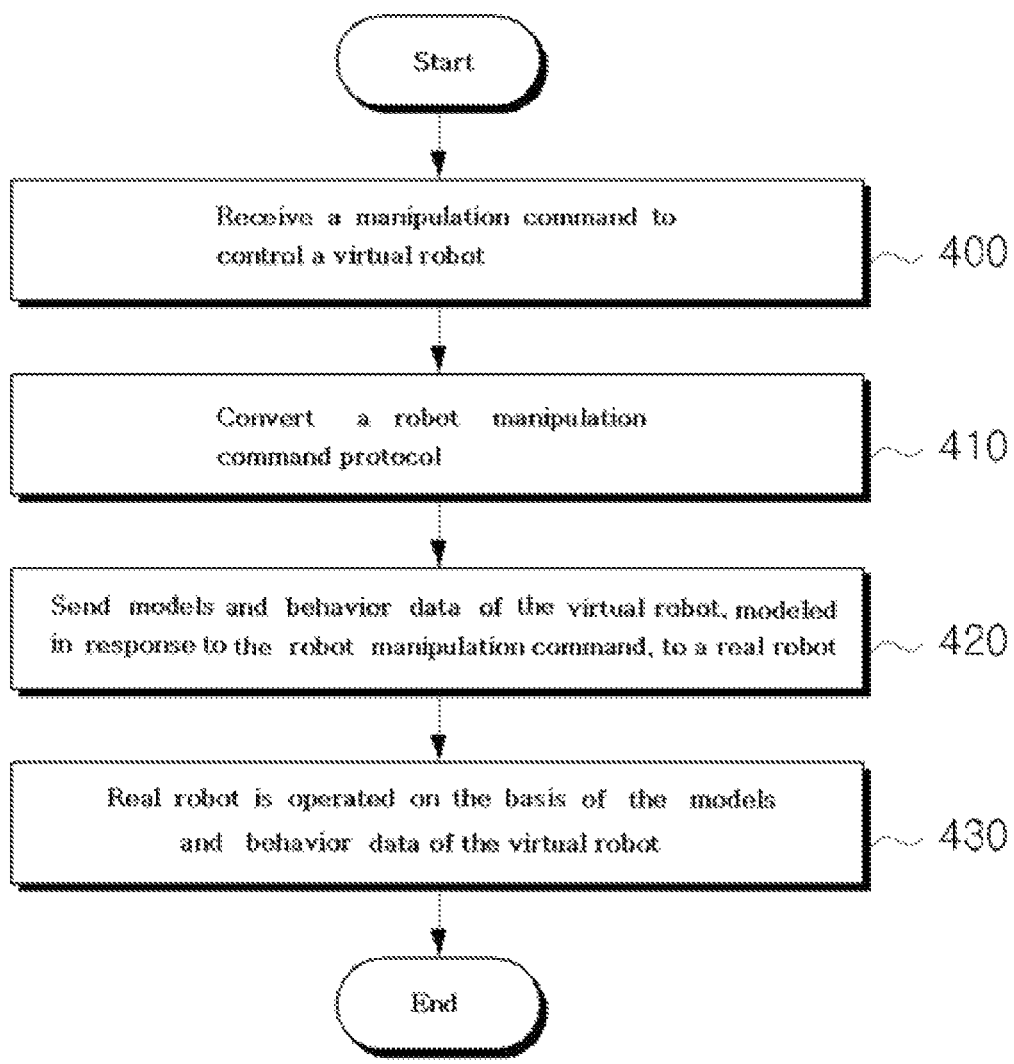
FIG. 4 is a flowchart illustrating a method of a virtual robot synchronizing a real robot according to an embodiment of the present invention.

FIG. 4 is a flowchart illustrating a method of the virtual robot 20 synchronizing the actual robot 1 according to an embodiment of the present invention.

Referring to FIG. 4, the robot synchronization apparatus 2 receives a manipulation command to control the virtual robot 20 at step 400. Next, the robot synchronization apparatus 2 converts a robot manipulation command protocol capable of manipulating the real robot 1, in response to the received manipulation command at step 410. Next, the robot synchronization apparatus 2 sends the models and behavior data of the virtual robot 20, modeled in response to the robot manipulation command, to the real robot 1 by using the converted robot manipulation command protocol at step 420. In response thereto, the real robot 1 receives the models and behavior data of the modeled virtual robot 20, and it is operated in the same manner as the virtual robot 20 on the basis of the models and behavior data at step 430.

Figure 5:
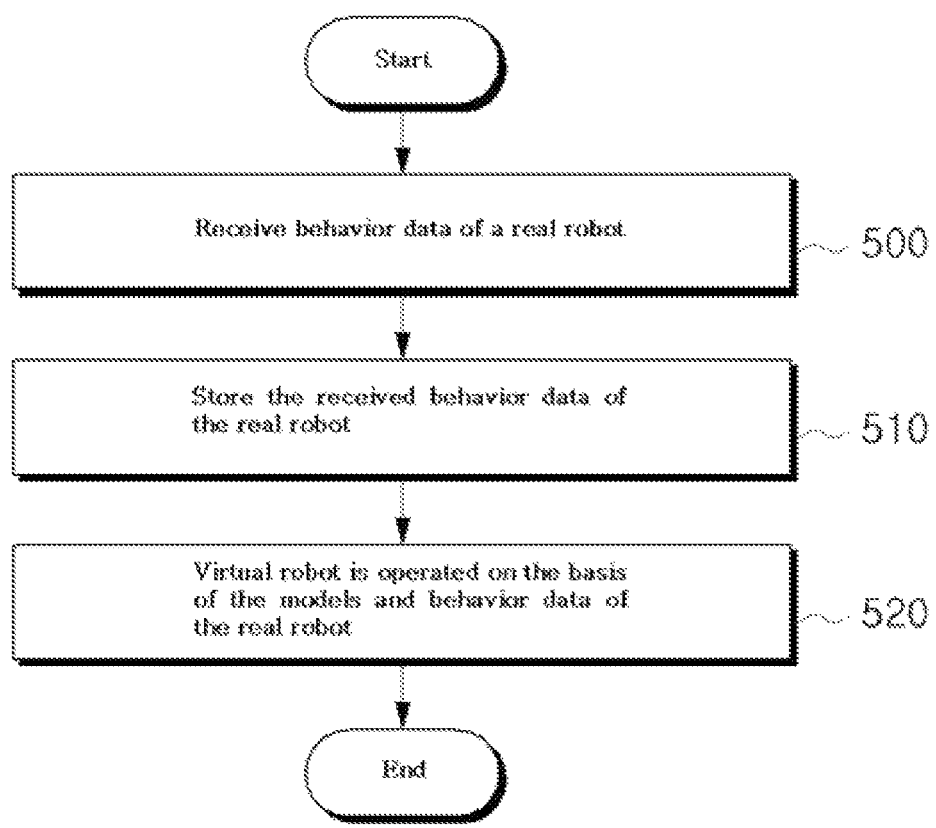
FIG. 5 is a flowchart illustrating a method of a virtual robot synchronized by a real robot according to an embodiment of the present invention.

FIG. 5 is a flowchart illustrating a method of the virtual robot 20 synchronized by the actual robot 1 according to an embodiment of the present invention.

Referring to FIG. 5, the robot synchronization apparatus 2 receives behavior data of the real robot 1 from the real robot 1 at step 500. Next, the robot synchronization apparatus 2 stores the received behavior data of the real robot 1 at step 510. Next, the robot synchronization apparatus 2 operates the virtual robot 20 on the basis of the stored behavior data of the real robot 1 at step 520. Accordingly, the virtual robot 20 may be operated in the same manner as a motion of the real robot 1.

As described above, since the virtual robot 20 and the real robot 1 are mutually synchronized, a user can easily operate the real robot 1 through the virtual robot 20 or operate the virtual robot 20 through the real robot 1.

Meanwhile, the robot synchronization apparatus 2 may integrate a plurality of received manipulation commands and store the plurality of received manipulation commands in the form of one consecutive manipulation command. Here, the robot synchronization apparatus 2 may control a behavior of the real robot 1 by sending the one consecutive manipulation command to the real robot 1. Accordingly, a user can manipulate the real robot easily and rapidly.

As described above, according to some embodiments, a virtual robot operated in conjunction with the behavior of a real robot may be outputted in real time. Accordingly, a user may be provided with the feeling of movement as if he operates a real robot through the virtual robot. Accordingly, a user's interesting and fun can be increased. Furthermore, the general public can easily control a robot through manipulation using the virtual robot even without a complicated controller.

Furthermore, since a virtual robot and a real robot are mutually synchronized, a user can easily operate the real robot through the virtual robot or operate the virtual robot through the real robot.

Furthermore, a plurality of manipulation commands may be integrated and stored in the form of one consecutive manipulation command. The behavior of a real robot may be controlled through the one consecutive manipulation command. Accordingly, a user can manipulate the real robot easily and rapidly.

Furthermore, a real robot may be tested through simulations of a virtual robot. Accordingly, there is less possibility that the elements of a real robot may be changed because of abnormality in the state in which the real robot has been completed. In addition, the present invention is efficient in terms of time and cost because any problem existing in the behavior or structure of a real robot can be accurately checked before the real robot is completed.

While some exemplary embodiments of the present invention have been described with reference to the accompanying drawings, those skilled in the art can change and modify the present invention in various ways without departing from the essential characteristic of the present invention. Accordingly, the disclosed embodiments should not be construed to limit the technical spirit of the present invention, but should be construed to illustrate the technical spirit of the present invention. The scope of the technical spirit of the present invention is not limited by the embodiments. The scope of the present invention should be interpreted according to the following appended claims. Accordingly, the present invention should be construed to cover all modifications or variations induced from the meaning and scope of the appended claims and their equivalents.

What is claimed is:

1. A portable robot synchronization apparatus, comprising:
   a storage unit configured to store data defining physical models and behaviors of a real robot;
   a manipulation unit;
   an output unit;
   a communication unit configured to perform wired and wireless communication with the real robot or a server; and
   a control unit configured to (a) model a size and behavior of a virtual robot, having a shape and behavior of the real robot, in response to a manipulation command received through the manipulation unit, on the basis of the data stored in the storage unit, (b) output the modeled virtual robot through the output unit, (c) control the behavior of the virtual robot in response to the behavior of the real robot when communicating with the real robot through the communication unit, (d) convert a robot manipulation command protocol capable of manipulating a real robot, in response to a manipulation command of the manipulation unit, and (e) send the models and behavior data of the modeled virtual robot to the real robot through the communication unit by using the converted robot manipulation command protocol.

2. The portable robot synchronization apparatus as claimed in claim 1, further comprising a real robot, wherein the control unit is configured to receive behavior data according to a result of the behavior of the real robot from the real robot through the communication unit, store the received behavior data in the storage unit, and control the behavior of the virtual robot on the basis of the stored behavior data of the real robot.

3. The portable robot synchronization apparatus as claimed in claim 1, wherein the control unit is configured to integrate a plurality of the manipulation commands received through the manipulation unit, store the plurality of received manipulation commands in the storage unit in the form of one consecutive manipulation command, and control the behavior of the real robot by sending the one consecutive manipulation command of the storage unit to the real robot through the communication unit.

4. The portable robot synchronization apparatus as claimed in claim 1, wherein the control unit is configured to recognize a real robot to be communicated therewith on the basis of a unique ID or an automatic robot recognition code which is distinguished from other real robots and communicate with the recognized real robot through the communication unit.

5. The portable robot synchronization apparatus as claimed in claim 1, wherein the control unit is configured to group a plurality of the real robots and control the plurality of grouped real robots by sending the models and behavior data of the modeled virtual robot to the plurality of grouped real robots through the communication unit by using the converted robot manipulation command protocol.

6. The portable robot synchronization apparatus as claimed in claim 1, wherein the output unit is a display configured to display 2D or 3D video and the modeled virtual robot in a 3D video.

7. The portable robot synchronization apparatus as claimed in claim 1, wherein the storage unit is a detachable memory or an external database apparatus.

8. A robot synchronization method using a portable robot synchronization apparatus, comprising the steps of:
   storing data defining physical models and behavior of a real robot;
   receiving a command to manipulate a virtual robot having a shape and behavior of the real robot;
   modeling a size and behavior of the virtual robot on the basis of the stored data in response to the received manipulation command;
   outputting the modeled virtual robot;
   controlling the behavior of the virtual robot on the basis of the behavior of the real robot through communication with the real robot;
   converting a robot manipulation command protocol capable of manipulating the real robot in response to the received manipulation command; and
   sending the models and behavior data of the modeled virtual robot to the real robot using the converted robot manipulation command protocol.

9. The robot synchronization method as claimed in claim 8, wherein the step of controlling the behavior of the virtual robot comprises the steps of:
   receiving behavior data according to a result of the behavior of the real robot from the real robot and storing the received behavior data of the real robot; and
   controlling the behavior of the virtual robot on the basis of the stored behavior data of the real robot.

10. The robot synchronization method as claimed in claim 8, further comprising the steps of:
   integrating a plurality of the received manipulation commands and storing the plurality of received manipulation commands in the form of one consecutive manipulation command; and
   controlling the behavior of the real robot by sending the stored one consecutive manipulation command to the real robot.

\* \* \* \* \*